United States Patent
Elzur

(10) Patent No.: US 10,255,203 B2
(45) Date of Patent: Apr. 9, 2019

(54) TECHNOLOGIES FOR ZERO-COPY INTER-VIRTUAL-MACHINE DATA MOVEMENT

(71) Applicant: Intel Corporation, Santa Clara, CA (US)

(72) Inventor: Uri Elzur, Irvine, CA (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 15/197,967

(22) Filed: Jun. 30, 2016

(65) Prior Publication Data
US 2018/0004680 A1    Jan. 4, 2018

(51) Int. Cl.
| | |
|---|---|
| *G06F 9/45* | (2006.01) |
| *G06F 12/08* | (2016.01) |
| *G06F 12/0808* | (2016.01) |
| *G06F 12/0815* | (2016.01) |
| *G06F 12/14* | (2006.01) |
| *G06F 9/455* | (2018.01) |

(52) U.S. Cl.
CPC ........ *G06F 12/145* (2013.01); *G06F 9/45558* (2013.01); *G06F 2009/45587* (2013.01); *G06F 2212/1052* (2013.01)

(58) Field of Classification Search
CPC ............ G06F 12/0284; G06F 12/1009; G06F 12/145; G06F 9/45558; G06F 13/28; G06F 3/061
USPC ........................................................ 711/163
See application file for complete search history.

(56) References Cited

U.S. PATENT DOCUMENTS

| | | | | |
|---|---|---|---|---|
| 9,454,676 | B2 * | 9/2016 | Vipat ...................... | G06F 21/79 |
| 9,569,247 | B2 * | 2/2017 | Tsirkin ............... | G06F 9/45558 |
| 2008/0244114 | A1 * | 10/2008 | Schluessler ............. | G06F 13/28 710/24 |
| 2014/0082751 | A1 * | 3/2014 | Vipat .................... | G06F 21/629 726/30 |
| 2014/0189194 | A1 * | 7/2014 | Sahita ................. | G06F 12/1009 711/6 |
| 2015/0269031 | A1 * | 9/2015 | Wang .................. | G06F 9/45558 718/1 |
| 2015/0379263 | A1 * | 12/2015 | Vipat ...................... | G06F 21/62 726/23 |

(Continued)

*Primary Examiner* — Mohamed M Gebril
(74) *Attorney, Agent, or Firm* — Barnes & Thornburg LLP

(57) ABSTRACT

Technologies for zero-copy inter-virtual-machine communication include a computing device with extended page table support. A sender virtual machine stores data in a shared memory block and enables access to protected code without generating a virtual machine exit, for example by executing a specialized processor instruction. From the protected code, the sender virtual machine sets a permission in an extended page table associated with the shared memory block and notifies a receiver virtual machine. When the permission is set, the sender virtual machine is prohibited from writing or executing the contents of the shared memory block. The receiver virtual machine reads data from the shared memory block and then enables access to protected code without generating a virtual machine exit. From the protected code, the receiver virtual machine clears the permission and notifies the sender virtual machine that reading is complete. Other embodiments are described and claimed.

18 Claims, 5 Drawing Sheets

(56) References Cited

U.S. PATENT DOCUMENTS

| | | | |
|---|---|---|---|
| 2016/0164880 A1* | 6/2016 | Colesa | H04L 63/105 726/1 |
| 2016/0231929 A1* | 8/2016 | Tsirkin | G06F 3/061 |
| 2016/0306749 A1* | 10/2016 | Tsirkin | G06F 12/145 |
| 2016/0335436 A1* | 11/2016 | Vipat | G06F 21/566 |
| 2016/0350233 A1* | 12/2016 | Tsirkin | G06F 9/50 |
| 2017/0026181 A1* | 1/2017 | Chhabra | G06F 9/45558 |
| 2017/0147376 A1* | 5/2017 | Tsirkin | G06F 9/45558 |

* cited by examiner

TECHNOLOGIES FOR ZERO-COPY INTER-VIRTUAL-MACHINE DATA MOVEMENT

BACKGROUND

Increasingly, network functions traditionally performed by dedicated hardware devices are being virtualized and performed by a partitioned physical platform. For example, network functions such as routing, packet filtering, caching, and other network functions may be performed by multiple virtual machines executed by a single, partitioned server. The virtualization platform may include any combination of network function virtualization (NFV), software-defined networking (SDN), and/or software-defined infrastructure (SDI). Accordingly, in such systems large amounts of data may be exchanged between virtual machines executed by a single physical platform. When managed by typical computer operating systems and/or virtual machine monitors (VMM), exchanging messages between virtual machines may require creating at least one copy of each message, which may consume platform bandwidth and/or add latency.

Typical computer processors include hardware support for virtualization operations. Software virtualization includes transparently executing one or more guest operating systems from within a host operating system or VMM. Hardware virtualization features may include an extended privilege model, hardware-assisted support for virtual memory addressing, support for extended memory permissions, and other virtualization features.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
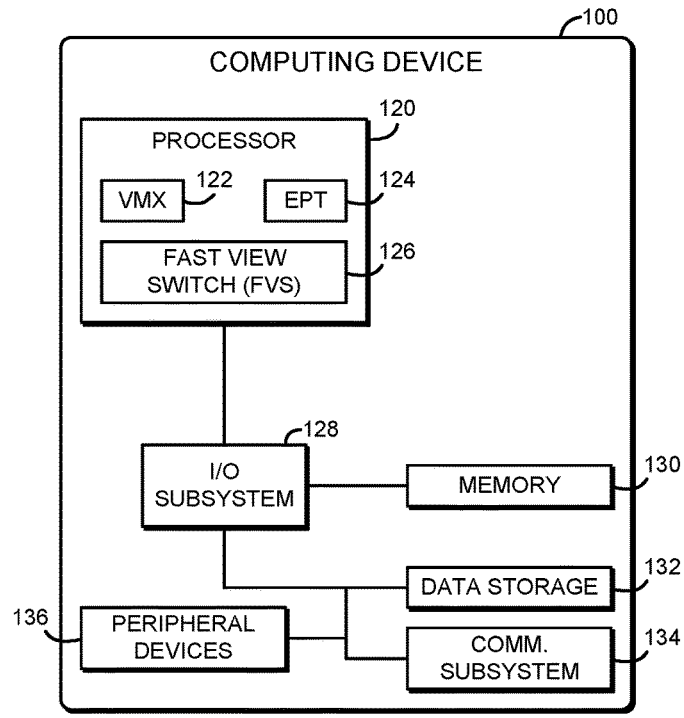
FIG. 1 is a simplified block diagram of at least one embodiment of a computing device for zero-copy inter-virtual-machine communication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for zero-copy inter-virtual-machine communication includes a processor 120, an I/O subsystem 128, a memory 130, and in some embodiments a data storage device 132. In use, as described below, the computing device 100 is configured to support zero-copy data movement between two or more virtual machines (and/or other containers when relevant). In particular, the computing device 100, assisted by a platform management entity such as a hypervisor or an element in it, e.g., a virtual machine, allocates one or more shared memory blocks to be used to exchange data between virtual machines. A sender virtual machine with read-write access to a shared memory block writes data to the shared memory block, and then switches to a protected memory view without generating a virtual machine (VM) exit. From protected code, the sender virtual machine triggers a platform entity that cannot be tampered with by the sender virtual machine, such as a specialized processor function, to set one or more page table flags for the shared memory block, denying write access to the sender entity and granting read access to the receiver virtual machine(s), and then notifies the receiver virtual machine(s) that data is available. After setting the page table flags, the sender virtual machine is prohibited from writing to the shared memory block, which may be enforced by the processor page tables, for example. In response to the notification, the receiver virtual machine can access, with read-only access rights, the shared memory block to process the data. After processing the data, the receiver virtual machine switches to a protected memory view without generating a VM exit, triggers the platform entity, which is also not accessible for tampering by the receiver entity, to clear the page table flags on the shared memory block, and notifies the sender virtual machine that the send/receive operation is complete. Thus, the computing device 100 may allow for efficient inter-virtual machine communication without requiring an additional copy of the message data and without generating additional VM exits. Additionally, because the shared memory block is protected from being written by the sender virtual machine (either through a programming error or maliciously) after a send operation is initiated, the computing device 100 may facilitate copy-on-write usage of the exchanged data.

The computing device 100 may be embodied as any type of device capable of performing inter-virtual-machine communication and otherwise performing the functions described herein. For example, the computing device 100 may be embodied as, without limitation, a workstation, a server computer, a distributed computing system, a multi-processor system, a laptop computer, a notebook computer, a tablet computer, a smartphone, a mobile computing device, a wearable computing device, a computer, a desktop computer, a consumer electronic device, a smart appliance, and/or any other computing device capable of inter-virtual-machine communication. As shown in FIG. 1, the illustrative computing device 100 includes a processor 120, an I/O subsystem 128, a memory 130, and optionally a data storage device 132. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Additionally, although illustrated as including a single processor 120, it should be understood that in some embodiments the computing device 100 may include multiple processors 120. The processor 120 includes hardware-based, hardware-assisted, or hardware-accelerated support for virtualization. In particular, the processor 120 includes virtual machine extensions (VMX) support 122, extended page table (EPT) support 124, and fast view switch (FVS) support 126. The VMX support 122 supports virtualized execution of operating systems by providing two modes of execution: VMX root mode and VMX non-root mode. The VMX root mode allows executing software to have broad control of the computing device 100 and its hardware resources. Accordingly, a virtual machine monitor (VMM), hypervisor, or host operating system may execute in VMX root mode. The VMX non-root mode restricts access to certain hardware instructions while still implementing the ordinary ring/privilege system of the processor 120. Thus, one or more guest virtual machines (VMs) and/or guest operating systems (OSs) may execute in the VMX non-root mode. Those guest OSs may execute in ring zero, similar to execution without virtualization. The execution of certain hardware instructions and certain other system events may trigger hardware-assisted transitions to VMX root mode. Those hardware-assisted transitions are commonly known as virtual machine exits (VM exits) or hypercalls. Upon encountering a VM exit, the processor 120 may switch context from the guest VM to the VMM in order to handle the VM exit. Thus, VM exits may impose a performance penalty on virtualized code. The VMX support 122 may be embodied as, for example, Intel® VT-x technology.

The EPT support 124 supports hardware-assisted second-level page address translation. For non-virtualized workloads (or when operating in VMX root mode), the processor 120 may provide hardware-assisted translation between virtual memory addresses (also known as linear addresses) to physical memory addresses. The processor 120 may translate memory addresses using one or more page table structures stored in the memory 130 and managed by a host operating system, hypervisor, or VMM. For virtualized workloads (or when operating in VMX non-root mode), the processor 120 supports hardware-assisted translation between virtual memory addresses (used, for example, by applications executing within a guest VM) to guest-physical memory addresses. A guest OS may maintain one or more page table structures in the memory 130 to manage the translation to guest-physical memory addresses. However, a guest-physical memory address may not correspond to an actual physical memory address within the memory 130. The EPT support 124 provides hardware-assisted translation between guest-physical memory addresses to physical memory addresses (also known as host-physical memory addresses). The EPT support 124 may translate memory addresses using one or more extended page table structures stored in the memory 130 and managed by the VMM or hypervisor. Without the EPT support 124, translation between guest-physical memory addresses and physical memory addresses may require one or more VM exits. The EPT support 124 also may support associating access permissions with each guest physical page and/or physical page (e.g., read, write, and/or execute permissions). Permissions violations, which may be known as EPT violations, may generate VM exits that allow the VMM or hypervisor to handle the EPT violation. Additionally or alternatively, in some embodiments, permissions violations may generate a virtualization exception that may be handled by a guest OS. The EPT support 124 may be embodied as, for example, Intel® VT-x technology.

The FVS support 126 allows the processor 120 to quickly and atomically switch between two or more memory views without requiring a VM exit to VMX root mode. A memory view includes the guest-physical page mapping and associated permissions defined by an EPT and thus may correspond one-to-one with an EPT. The FVS support 126 may support switching memory views by changing a EPT pointer (EPTP) within an in-memory virtual machine control structure (VMCS) to point to a different EPT structure. In some embodiments, the FVS support 126 may allow software in VMX non-root mode to trigger code in VMX-root mode to select one of several memory views that have been predefined by software executing within the VMX root mode. Accordingly, the FVS support 126 may allow a guest VM (e.g., a guest OS or application software executing in the guest VM) to switch between memory views without requiring a potentially expensive context switch to the VMM or hypervisor. The FVS support 126 may be embodied as a specialized processor instruction such as the VMFUNC instruction supported by certain Intel® processors.

The memory 130 may be embodied as any type of volatile or non-volatile memory or data storage capable of performing the functions described herein. In operation, the memory 130 may store various data and software used during operation of the computing device 100 such operating systems, applications, programs, libraries, and drivers. The memory 130 may be subdivided into fixed-sized segments known as pages. Each page may include, for example, 4096 bytes of data, or another other amount of data that may be optimized for data messages. In use, the memory 130 may further store one or more page tables, including guest page tables and/or extended page tables (EPTs). As described above, each guest page table stores mappings between virtual memory pages and guest-physical memory pages that may be used by the processor 120 to translate between virtual memory addresses and guest-physical memory addresses. Each EPT stores mappings between guest-physical memory pages and physical memory pages that may be used by the EPT support 124 of the processor 120 to translate between guest-physical memory addresses and physical memory addresses. Each EPT may also include access permissions (e.g., read, write, and/or execute) and may include one or more sender flags for each guest-physical page. Both the guest page tables and the EPTs may be embodied as one or more in-memory data structures such as arrays, lists, associative arrays, nested or hierarchical arrays, or other data structures. The memory 130 may also store one or more extended page table pointers (EPTPs). As described above, the EPTPs may be used by the processor 120 to identify the currently active EPT. Thus, changing an EPTP associated with a guest VM may allow the computing device 100 to quickly change physical memory mappings for the guest VM. As described above, the EPTPs may be managed by the FVS support 126 of the processor 120.

The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 128 may form a portion of a system-on-a-chip (SoC) and be incorporated, along with the processor 120, the memory 130, and other components of the computing device 100, on a single integrated circuit chip.

The data storage device 132, if included in the computing device 100, may be embodied as any type of device or devices configured for short-term or long-term storage of data such as, for example, memory devices and circuits, memory cards, hard disk drives, solid-state drives, or other data storage devices. The computing device 100 may also include a communication subsystem 134. The communication subsystem 134 may be embodied as any communication circuit, device, network interface controller, or collection thereof, capable of enabling communications between the computing device 100 and other remote devices over a network. The communication subsystem 134 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may also include one or more peripheral devices 136. The peripheral devices 136 may include any number of additional input/output devices, interface devices, and/or other peripheral devices. For example, in some embodiments, the peripheral devices 136 may include a display, touch screen, graphics circuitry, keyboard, mouse, speaker system, and/or other input/output devices, interface devices, and/or peripheral devices.

Figure 2:
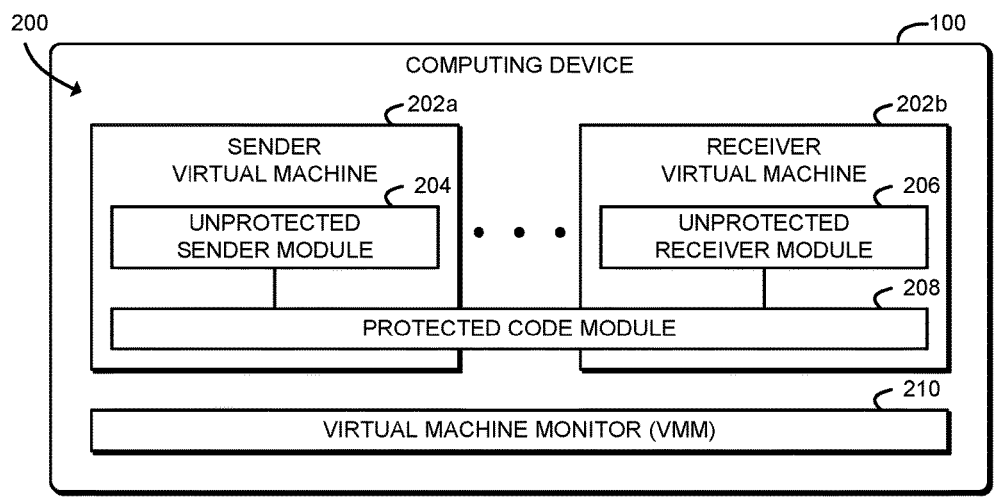
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes multiple virtual machines 202, an unprotected sender module 204, an unprotected receiver module 206, a protected code module 208, and a virtual machine monitor (VMM) 210. Although illustrated as including two virtual machines (VMs) 202a, 202b, it should be understood that in other embodiments the environment 200 may include additional VMs 202. The various modules of the environment 200 may be embodied as hardware, firmware, software, or a combination thereof. As such, in some embodiments, one or more of the modules of the environment 200 may be embodied as circuitry or collection of electrical devices (e.g., unprotected sender circuitry 204, unprotected receiver circuitry 206, and/or protected code circuitry 208). It should be appreciated that, in such embodiments, one or more of the unprotected sender circuitry 204, the unprotected receiver circuitry 206, and/or the protected code circuitry 208 may form a portion of one or more of the processor 120, the I/O subsystem 128, and/or other components of the computing device 100. Additionally, in some embodiments, one or more of the illustrative modules may form a portion of another module and/or one or more of the illustrative modules may be independent of one another.

Each of the virtual machines 202 is configured to perform a virtualized workload on the computing device 100, for example a virtualized network function. As described further below, the sender virtual machine 202a is configured to transmit messages to one or more receiver virtual machines 202b. The VMM 210 may be embodied as any virtual machine monitor, hypervisor, or other component that allows virtualized workloads to be executed on the computing device 100. The VMM 210 may have complete control over the computing device 100, for example by executing in a non-virtualized host mode, such as ringlevel 0 and/or VMX-root mode.

The unprotected sender module 204 is configured to store, by the sender virtual machine 202a, data into one or more memory blocks. The memory blocks can later be shared with other virtual machines 202 or the memory blocks may be set up as shared in advance. The sender virtual machine 202a has read-write access to the shared memory blocks. The unprotected sender module 204 is further configured to enable access by the sender virtual machine 202a to a protected code segment in the memory 130 of the computing device 100 which it may access for securing code only, in response to storing the data into the shared memory blocks, without generating a VM exit event. In some embodiments, enabling access to the protected code may include executing, by the sender virtual machine 202a, a processor 120 instruction to enable access to the protected code without generation of a virtual machine exit event. The unprotected sender module 204 may be further configured to execute trampoline code by the sender virtual machine 202a following storing the data into the shared memory blocks. The trampoline code is to enable the protected code.

The protected code module 208 is configured to execute the protected code in the context of the sender virtual machine 202a and to set a permission of an extended page table associated with the sender memory blocks in response to executing the protected code. Setting the permission disallows write access and execute access by the sender virtual machine 202a to the shared memory blocks, for example by disallowing a write and/or execute access to that memory address and further causing the processor 120 to generate a VM exit in response to a write or execute access to a shared memory block by the sender virtual machine 202a when the permission is set. The protected code module 208 is further configured to notify, by the protected code, a receiver virtual machine 202b that the data is available after setting the permission, allowing for read access only by the receiver virtual machine 202b. The protected code module 208 may be further configured to monitor for notifications from receiver virtual machines 202b that reading the data is complete and to disable access by the sender virtual machine 202a to the protected code in response to receiving a notification, without generating a VM exit. In some embodiments, the protected code module 208 may be further configured to notify, by the protected code, multiple receiver virtual machines 202b that the data is available in the shared memory blocks. The protected code module 208 may be configured to initialize a counter associated with the shared memory blocks that indicates a total number of receiver virtual machines 202b to receive the data. Upon receiving an indication from each receiver virtual machine 202b that the receive is complete, the protected code 208 may decrement the counter or otherwise note that the receive is complete, so that the protected code 208 may be able to determine when all receiver virtual machines 202b have received the data (for example when the counter reaches zero).

The unprotected receiver module 206 is configured to read, by the receiver virtual machine 202b, the data from the shared memory blocks in response to notification of the receiver virtual machine 202b. The receiver virtual machine 202b has read-only access to the shared memory blocks. Similar to the unprotected sender module 204, the unprotected receiver module 206 may be further configured to enable access by the receiver virtual machine 202b to protected code in the memory 130 of the computing device 100 following reading the data from the shared memory blocks, without generating a VM exit.

A signaling mechanism may be used to notify each virtual machine 202 of data availability (sender side to receiver side) or that the data has been read (receiver to sender). In such embodiments, the protected code 208 on the sender side may unilaterally set and reset access rights in the EPT, as described above. Alternatively, the protected code module 208 may be further configured to execute the protected code in the context of the receiver virtual machine 202b and clear a permission of an extended page table associated with the shared memory blocks after reading the data in the shared memory blocks. Clearing the permission allows write access by the sender virtual machine 202a to the shared memory blocks. The protected code module 208 may be further configured to determine, by the protected code, whether all of the receiver virtual machines 202b have completed reading the data from the shared memory blocks, for example by atomically decrementing a counter of intended receiver virtual machines 202b and comparing the counter to zero. The protected code module 208 may be further configured to notify, by the protected code, the sender virtual machine 202a that reading the data is complete in response to determining that all of the receiver virtual machines 202b have completed reading the data.

Figure 3:
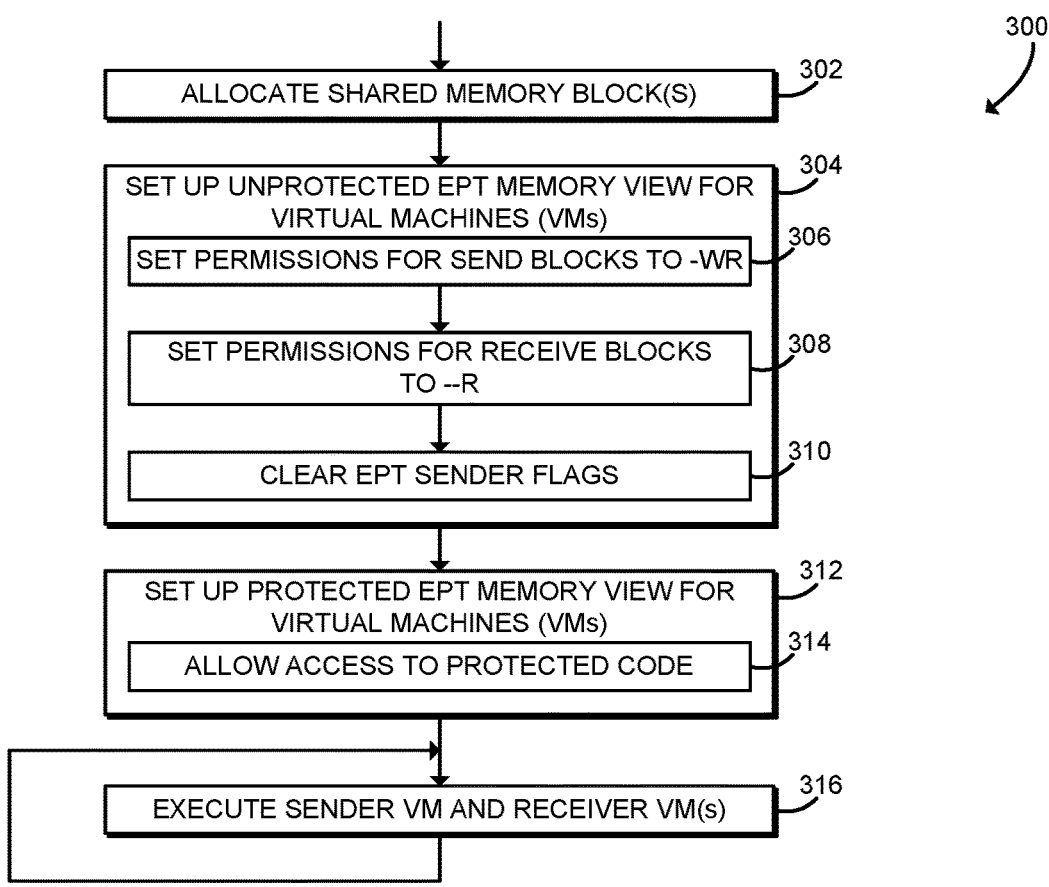
FIG. 3 is a simplified flow diagram of at least one embodiment of a method for inter-virtual-machine communication that may be executed by the computing device of FIGS. 1 and 2.

Referring now to FIG. 3, in use, the computing device 100 may execute a method 300 for inter-virtual-machine communication. It should be understood that the method 300 may be executed by one or more of the modules of the environment 200, described above in connection with FIG. 2. The method 300 may be executed by the VMM 210 and thus may execute in VMX root mode with full access to the computing device 100, including the ability to manage extended page tables (EPTs). The method 300 begins in block 302, in which the computing device 100 allocates one or more shared memory blocks to be used for data communication. Each shared memory block may be used as a "send" block by a sender virtual machine 202a or as a "receive" block by a receiver virtual machine 202b. In various embodiments, the shared memory blocks may have different sizes. For example, a shared memory block may be embodied as a cache line, a 2 kilobyte (kB) memory page, a 4 kB memory page, a "huge" memory page, and/or multiple memory pages. The size of the shared memory blocks may depend on the semantics of data typically transferred between virtual machines 202. For example, 2 kB memory pages may be used to store Ethernet packet data. Additionally, the memory blocks may be established at any level of the memory hierarchy. For example, the shared memory blocks may be allocated in the system memory 130 or in cache memory of the processor 120 (e.g., a private processor cache or a shared last-level cache). Memory allocation is performed by privileged code of the computing device 100, such as the VMM 210.

In block 304, the computing device 100 sets up unprotected extended page table (EPT) memory views for each of the virtual machines (VMs) 202. The EPT memory view stores mappings between guest-physical memory pages and physical memory pages (i.e., locations in the memory 130) that may be used by the EPT support 124 of the processor 120 to translate between guest-physical memory addresses and physical memory addresses. Thus, the EPT memory view defines a mapping from virtual memory addresses used by guest software of each virtual machine 202a to physical memory locations in the memory 130. The EPT also includes read, write, and execute access permissions for each guest-physical page, and one or more sender flags associated with each guest-physical page, as described further below. In block 306, the computing device 100 sets the permissions for send memory blocks to writable and readable. Thus, an associated sender virtual machine 202a may access the send memory blocks as a sender and write data to be communicated to receiver virtual machines 202b. In block 308, the computing device 100 sets the permissions for receive memory blocks to read-only. Thus, an associated receiver virtual machine 202b may access the receive memory blocks to read data but may not write data to the receive memory blocks. In block 310, the computing device 100 clears the EPT sender flags associated with the shared memory blocks. As described below, clearing the EPT sender flags allows the sender virtual machine 202a to write to the send memory blocks.

In block 312, the computing device 100 sets up protected EPT memory views for the virtual machines 202. The protected EPT memory views provide similar access to the shared memory blocks as the unprotected memory views (i.e., read-write access to the send blocks and read-only access to receive blocks). In block 314, the computing device 100 configures the protected EPT memory views to provide access to one or more protected code segments (e.g., read-execute access to one or more memory pages corresponding to the protected code segments). The protected code segments are not accessible through the unprotected memory views. For example, the unprotected memory views may not include any mapping that reaches the protected code segments, or the unprotected memory views may use EPT permissions to deny access to the protected code segments. As described further below, the protected code manipulates page table flags and manages communication between the sender virtual machine 202a and the receiver virtual machines 202b. As described further below, each of the sender virtual machine 202a and the receiver virtual machines 202b may enable the protected code by switching between the corresponding unprotected EPT memory view and protected EPT memory view without generating a virtual machine exit, for example by using the fast view switch support 126 of the processor 120.

In block 316, the computing device 100 executes the sender VM 202a and the receiver VMs 202b. Each of the VMs 202 is executed in VMX non-root mode; that is, each of the VMs 202 executes as a guest. Each of the VMs 202 starts execution using a corresponding unprotected EPT memory view. To communicate data between the VMs 202, the sender VM 202a stores data into an appropriate send memory block, switches to the protected memory view, and invokes the protected code to notify one or more receiver VMs 202b that data is available. The receiver VMs 202b, in turn, read the data from the appropriate shared memory blocks. Data transmission is performed without generating a VM exit to the VMM 210 and without copying the data between the VMs 202. One potential embodiment of a method for sending data that may be executed by the sender VM 202a is described below in connection with FIG. 5, and one potential embodiment of a method for receiving data that may be executed by each of the receiver VMs 202b is described below in connection with FIG. 6. After beginning execution of the sender VM 202a and the receiver VMs 202b, the method 300 loops back to block 316 to continue executing the VMs 202.

Figure 4:
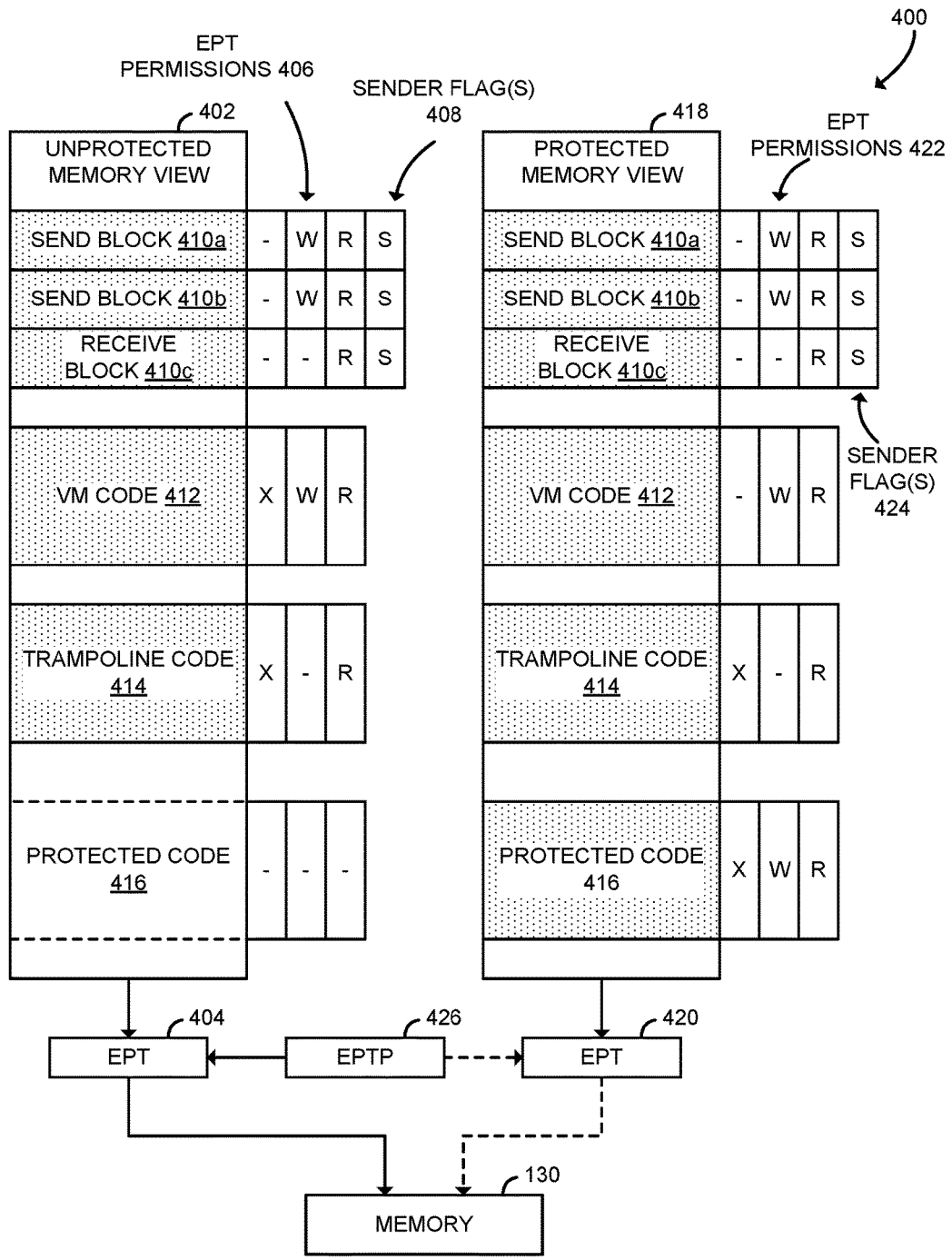
FIG. 4 is a schematic diagram illustrating memory views that may be established by the computing device of FIGS. 1 and 2.

Referring now to FIG. 4, the schematic diagram 400 illustrates potential memory views that may be established by the computing device 100. As described above in connection with block 304 of FIG. 3, the computing device 100 may set up an unprotected memory view 402 for a VM 202. The unprotected memory view 402 is associated with an EPT 404 and associated EPT permissions 406 and sender flags 408. Thus, the unprotected memory view 402 provides a mapping for guest access to the physical memory 130.

As illustrated, the unprotected memory view 402 includes three shared memory blocks 410. In particular, the unprotected memory view 402 includes two send blocks 410a, 410b and a receive block 410c. Each of the send blocks 410a, 410b have EPT permissions 406 set to writable and readable but not executable (i.e., "-WR"). The receive block 410c has EPT permissions 406 set to readable but not writable and not executable (i.e., "--R").

The unprotected memory view 402 also includes VM code 412 and trampoline code 414. The VM code 412 may include guest operating system and application code, and may communicate with other virtual machines executed by the computing device 100. For example, the VM code 412 may be embodied as a sender VM 202a with respect to the send blocks 410a, 410b and/or as a receiver VM 202b with respect to the receive block 410c. Thus, the same unprotected memory view 402 may be used by a VM 202 both for sending data stored in a send block 410a, 410b and for receiving data in a receive block 410c. The VM code 412 illustratively has EPT permissions 406 set to executable, writable, and readable (i.e., "XWR"). The VM code 412 may invoke the trampoline code 414 to send data to another VM 202b. As described further below, the trampoline code 414 may switch to a protected memory view 418 and then invoke protected code 416 to send the data. The trampoline code 414 illustratively has EPT permissions 406 set to executable and readable but not writable (i.e., "X-R").

As shown, the unprotected memory view 402 may include protected code 416. As described further below, the protected code 416 may manage communication between the VM code 412 and other VMs 202, including coordinating notifications and/or managing page table permissions. In some embodiments, the unprotected memory view 402 may not include any mappings to the physical pages in the memory 130 containing the protected code 416. In those embodiments, the protected code 416 may not be accessible to code (e.g., the VM code 412 and/or the trampoline code 414) executing in the unprotected memory view 402. Additionally or alternatively, in some embodiments the protected code 416 may be included in the unprotected memory view 402, but the EPT permissions 406 for the protected code 416 may be set to not executable, not writable, and not readable (i.e., "---"). In those embodiments, accessing the protected code 416 from code executing in the unprotected memory view 402 may generate a VM exit or other fault.

The schematic diagram 400 also illustrates the protected memory view 418. As described above in connection with block 312 of FIG. 3, the computing device 100 may set up the protected memory view 418 for a VM 202. The protected memory view 418 is associated with an EPT 420 and associated EPT permissions 422 and sender flags 424. Thus, the protected memory view 418 provides an alternative mapping for guest access to the physical memory 130.

As shown, the protected memory view 418 includes the shared memory blocks 410a, 410b, 410c. The EPT permissions 422 for those shared memory blocks 410 are the same as the EPT permissions 406. That is, the send blocks 410a, 410b are writable and readable, and the receive block 410c is readable but not writable. Similarly, the protected memory view 418 also includes the VM code 412 and the trampoline code 414. Unlike with the unprotected memory view 402, the EPT permissions 422 for the VM code 412 are set to writable and readable but not executable (i.e., "-WR"). Thus, while operating in the protected memory view 418, the VM code 412 may not be executed. The EPT permissions 422 for the trampoline code 414 are set to executable and readable but not writable (i.e., "X-R"), the same as the EPT permissions 406 for the VM code 412. The protected memory view 418 includes mappings to the protected code 416. Additionally, the protected code 416 illustratively has EPT permissions 422 set to executable, writable, and readable (i.e., "XWR"). Thus, while operating in the protected memory view 418, the protected code 416 may be executed.

The diagram 400 further illustrates an EPT pointer (EPTP) 426. The EPTP 426 may be used by the processor 120 to identify the active EPT and thus may determine the active physical memory mapping for guest programs. As illustrated, the EPTP 426 points to the EPT 404, meaning that the unprotected memory view 402 is active. When the EPTP 426 is switched to point to the EPT 420, the protected memory view 418 becomes active. As described above, the fast view switch support 126 of the processor 120 may allow guest software (e.g., the VM code 412 and/or the trampoline code 414) to switch the EPTP 426 between the EPTs 404, 420.

Figure 5:
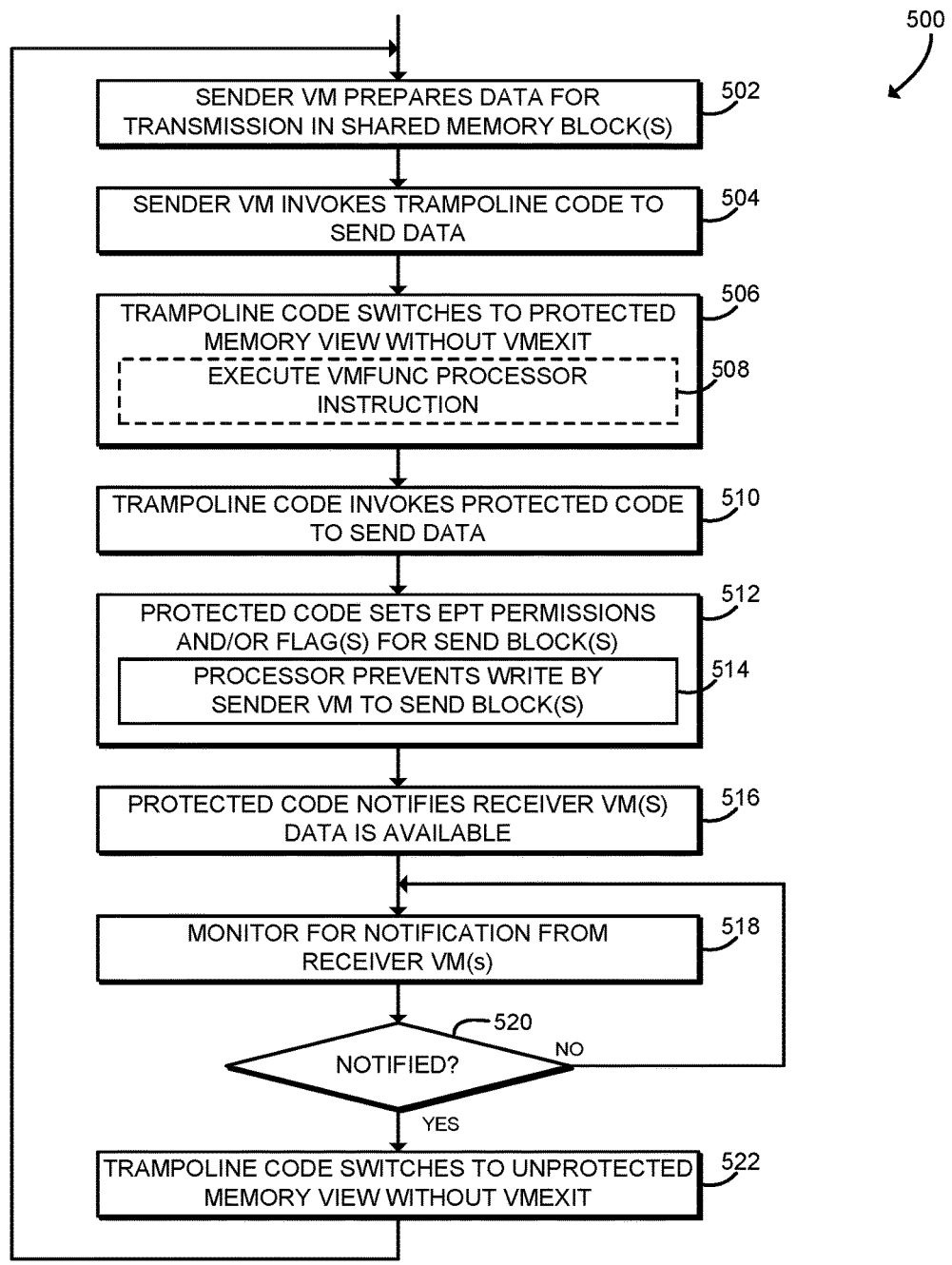
FIG. 5 is a simplified flow diagram of at least one embodiment of a method for sending data by a virtual machine that may be executed by the computing device of FIGS. 1 and 2.

Referring now to FIG. 5, in use, the computing device 100 may execute a method 500 for sending data from a sender VM 202a to a receiver VM 202b. It should be understood that the method 500 may be executed by one or more of the modules of the environment 200, described above in connection with FIG. 2. The method 500 may be executed by the sender VM 202a and thus may execute in VMX non-root mode, with access to the memory 130 mapped through one or more extended page tables (EPTs). The method 500 begins in block 502, in which the sender VM 202a prepares data for transmission in one or more shared memory blocks. The sender VM 202a accesses the shared memory blocks using an unprotected memory view that provides read-write access to the shared memory blocks. The sender VM 202a may store the data to be transmitted in the shared memory blocks. The sender VM 202a may be optimized for placing block-aligned messages. Multiple messages may be batched or otherwise combined, for example by being placed in a linked-list fashion.

In block 504, the sender VM 202a invokes trampoline code to send the data that is stored in the shared memory blocks. For example, the sender VM 202a may invoke a function located within the trampoline code. The trampoline code is invoked using the unprotected memory view.

In block 506, the trampoline code switches to a protected memory view without generating a virtual machine exit (VM exit). Thus, the trampoline code switches to the protected memory view while continuing to execute in the context of the sender VM 202a (e.g., in the VMX non-root mode) and thereby prevents a potentially expensive context switch to the VMM 210. The computing device 100 may use any appropriate paravirtualization technique to switch to the protected memory view. In some embodiments, in block 508 the computing device 100 may execute a VMFUNC processor instruction to switch to the protected memory view. The VMFUNC processor instruction may cause the computing device 100 to switch the contents of an EPT pointer, which causes the active EPT to be changed.

In block 510, the trampoline code invokes protected code to send the data stored in the shared memory blocks. For example, the trampoline code may invoke a function located within the protected code. As described above, the protected code is accessible using the protected memory view but is not accessible using the unprotected memory view. For example, the protected code may not be included in the unprotected memory view, or the EPT permissions in the unprotected memory view may prevent the protected code from being executed.

In block 512, the protected code sets the EPT permissions and/or sender flag(s) for each of the shared memory blocks. In particular, the protected code may set the EPT permissions associated with the shared memory blocks to prohibit write and execute access (i.e., "--R" permissions). In some embodiments, the protected code may also set one or more sender flags, for example by setting a multicast counter to include the number of intended receiver VMs 202b. The EPT, including the permissions and any associated sender flags, may be stored in the memory 130, for example as a field in one or more EPT entries associated with the shared memory block. The protected code may have privileged access to the EPT permissions, and the EPT permissions may not be set by code without privileged access to the EPT permissions. In block 514, after the EPT permissions are set, the processor 120 prevents the sender VM 202a from modifying the contents of the shared memory blocks. For example, if the sender VM 202a attempts to write to data stored in a shared memory block, the processor 120 may generate a VM exit or other fault.

In block 516, the protected code notifies one or more receiver VMs 202b that data is available in the shared memory blocks. The computing device 100 may use any technique for notifying the receiver VMs 202b, such as signals, semaphores, or other inter-process communication techniques. In some embodiments, for a multicast or broadcast message, the sender VM 202a may set a multicast counter with the number of receiver VMs 202b that will receive the message. The multicast counter may be stored, for example, in one or more of the sender flags of the EPT. As described further below in connection with FIG. 6, the receiver VMs 202b may read the data from the shared memory blocks and otherwise process the data. After reading the data, the receiver VM 202b may clear the EPT sender flag associated with the shared memory block.

In block 518, the protected code monitors for a notification from one or more of the receiver VMs 202b that the send/receive operation is complete. The protected code may receive a single notification after all of the receiver VMs 202b complete processing the data from the shared memory blocks. The computing device 100 may use any technique for monitoring for notifications, such as signals, semaphores, or other inter-process communication techniques. In block 520, the computing device 100 determines whether the protected code has been notified. If not, the method 500 loops back to block 518 to continue monitoring for notifications. If the protected code has been notified, the method 500 advances to block 522. Additionally, although illustrated as monitoring for notifications synchronously, it should be understood that the computing device 100 may use any other technique to monitor for interrupts (e.g., by waiting for an interrupt or other asynchronous notification).

In block 522, the trampoline code switches back to the unprotected memory view without generating a VM exit. For example, the protected code may return from a function to the trampoline code, which may in turn use a paravirtualization technique to switch back to the unprotected memory view. For example, the computing device 100 may execute a VMFUNC processor instruction to switch to the unprotected memory view. After switching to the unprotected memory view, the sender VM 202a may no longer access the protected code. The method 500 loops back to block 502 to continue sending data to the receiver VMs 202b.

Figure 6:
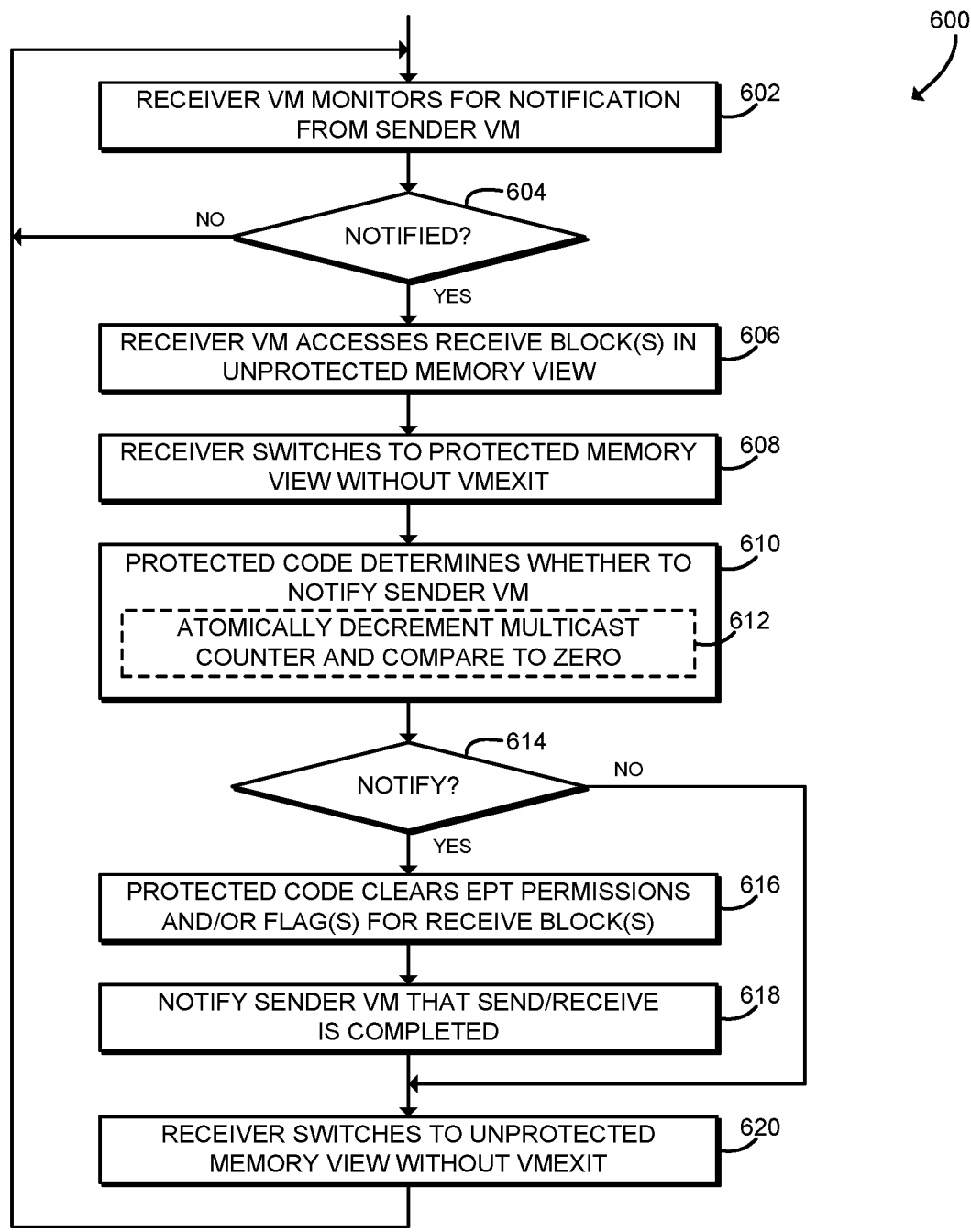
FIG. 6 is a simplified flow diagram of at least one embodiment of a method for receiving data by a virtual machine that may be executed by the computing device of FIGS. 1 and 2.

Referring now to FIG. 6, in use, the computing device 100 may execute a method 600 for receiving data by a receiver VM 202b from a sender VM 202a. It should be understood that the method 600 may be executed by one or more of the modules of the environment 200, described above in connection with FIG. 2. The method 600 may be executed by the receiver VM 202b and thus may execute in VMX non-root mode, with access to the memory 130 mapped through one or more extended page tables (EPTs). The method 600 begins in block 602, in which the receiver VM 202b monitors for a notification from a sender VM 202a that data is available in one or more shared memory blocks. As described above, the computing device 100 may use any technique for notifying the receiver VM 202b, such as signals, semaphores, or other inter-process communication techniques. In block 604, the receiver VM 202b determines whether a notification has been received. If not, the method 600 loops back to block 602 to continue monitoring for notifications. If a notification has been received, the method 600 advances to block 606. Additionally, although illustrated as monitoring for notifications synchronously, it should be understood that the computing device 100 may use any other technique to monitor for interrupts (e.g., by waiting for an interrupt or other asynchronous notification).

In block 606, the receiver VM 202b accesses data stored in the shared memory blocks using an unprotected memory view that provides read-only access to the shared memory blocks. The receiver VM 202b may perform any additional processing for the data in the shared memory blocks. Because no additional copies of the data may be created, it should be understood that the data may remain in the shared memory block until processing is completed.

After completing processing of the data in the shard memory blocks, in block 608 the receiver VM 202b switches to a protected memory view without generating a virtual machine exit (VM exit). Thus, the receiver VM 202b switches to the protected memory view while continuing to execute in the context of the receiver VM 202b (e.g., in the VMX non-root mode) and thereby prevents a potentially expensive context switch to the VMM 210. The computing device 100 may use any appropriate paravirtualization technique to switch to the protected memory view. For example, the computing device 100 may execute a VMFUNC processor instruction to switch to the protected memory view. The VMFUNC processor instruction may cause the computing device 100 to switch the contents of an EPT pointer, which causes the active EPT to be changed.

In block 610, protected code determines whether to notify the sender VM 202a that processing is complete. As described above, the protected code is accessible using the protected memory view but is not accessible using the unprotected memory view. For example, the protected code may not be included in the unprotected memory view, or the EPT permissions in the unprotected memory view may prevent the protected code from being executed. The protected code may determine whether to notify the sender VM 202a based on the type of message that was sent. For example, for a unicast message, the protected code may always notify the sender VM 202a. For a broadcast or multicast message, only the last receiver VM 202b to complete processing the shared memory block may notify the sender VM 202a. In some embodiments, in block 612 the protected code may atomically decrement a multicast counter and compare the counter to zero. As described above, in some embodiments, for a multicast or broadcast message, the sender VM 202a may set a multicast counter with the number of receiver VMs 202b that will receive the message. The multicast counter may be stored, for example, in one or more of the sender flags of the EPT. The protected code may have privileged access to the multicast counter.

In block 614, the protected code determines whether or not to notify the sender VM 202a. If not, the method 600 branches ahead to block 620, described further below. If the protected code determines to notify the sender VM 202a, the method 600 advances to block 616.

In block 616, the protected code clears the EPT permissions and/or sender flags for the receive blocks that have been processed. For example, the protected code may restore write access (i.e., "-WR" permissions) to the sender VM 202a for receive blocks that have been processed. As described above, the EPT permissions may be stored in the memory 130, for example as a field in one or more EPT entries associated with the shared memory block. The protected code may have privileged access to the EPT permissions, and the EPT permissions may not be cleared by code without privileged access to the EPT permissions. After the EPT permissions and/or sender flags are cleared, the processor 120 again allows the sender VM 202a to write to the shared memory blocks. Thus, after clearing the EPT permissions, the sender VM 202a may transmit additional data.

In block 618, the protected code notifies the sender VM 202a that the send/receive operation is completed. As described above, the computing device 100 may use any technique for notifying the sender VM 202a, such as signals, semaphores, or other inter-process communication techniques.

In block 620, the receiver VM 202b switches back to the unprotected memory view without generating a VM exit. For example, the protected code may return from a function to the receiver VM 202b, which may in turn use a paravirtualization technique to switch back to the unprotected memory view. For example, the computing device 100 may execute a VMFUNC processor instruction to switch to the unprotected memory view. After switching to the unprotected memory view, the receiver VM 202b may no longer access the protected code. The method 600 loops back to block 602 to continue receiving data from a sender VM 202a.

It should be appreciated that, in some embodiments, the methods 300, 500, and/or 600 may be embodied as various instructions stored on a computer-readable media, which may be executed by the processor 120, the I/O subsystem 128, and/or other components of the computing device 100 to cause the computing device 100 to perform the respective method 300, 500, and/or 600. The computer-readable media may be embodied as any type of media capable of being read by the computing device 100 including, but not limited to, the memory 130, the data storage device 132, microcode of the processor 120, firmware devices, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for inter-virtual-machine communication, the computing device comprising: a processor; and one or more memory devices having stored therein a plurality of instructions that, when executed by the processor, cause the computing device to: store, by a first virtual machine executed by the computing device, data into a first memory block wherein the first virtual machine has read-write access to the first memory block; enable access by the first virtual machine to a protected code of the computing device in response to storage of the data into the first memory block, without generation of a virtual machine exit event; execute the protected code in a context of the first virtual machine in response to enabling of access to the protected code set a permission of an extended page table associated with the first memory block in response to execution of the protected code, wherein setting of the permission disallows write access and execute access by the first virtual machine to the first memory block; and notify, by the protected code, a second virtual machine executed by the computing device that the data is available in response to the setting of the permission.

Example 2 includes the subject matter of Example 1, and wherein to enable access to the protected code comprises to execute, by the first virtual machine, a processor instruction to enable access to the protected code without generation of a virtual machine exit event.

Example 3 includes the subject matter of any of Examples 1 and 2, and wherein the processor is further to generate a virtual machine exit event in response to a write or execute access to the first memory block by the first virtual machine when the permission is set.

Example 4 includes the subject matter of any of Examples 1-3, and wherein the first memory block comprises one or more physical memory pages of the computing device.

Example 5 includes the subject matter of any of Examples 1-4, and wherein the first memory block is located in a cache memory of the computing device.

Example 6 includes the subject matter of any of Examples 1-5, and wherein: to store the data into the first memory block comprises to store the data into the first memory block with a first memory view, wherein the first memory view defines a physical memory map of the computing device, and wherein the first memory view allows read-write access to the first memory block and does not allow access to the protected code; and to enable access to the protected code comprises to switch, by the first virtual machine, to a second memory view without generation of a virtual machine exit event, wherein the second memory view defines a physical memory map of the computing device, and wherein the second memory view allows execute access to the protected code.

Example 7 includes the subject matter of any of Examples 1-6, and wherein the first memory view is defined by a first extended page table of the computing device and the second memory view is defined by a second extended page table of the computing device.

Example 8 includes the subject matter of any of Examples 1-7, and wherein to switch to the second memory view comprises to set an extended page table pointer of the computing device to reference the second extended page table.

Example 9 includes the subject matter of any of Examples 1-8, and wherein to set the extended page table pointer comprises to execute a processor instruction to change the extended page table pointer.

Example 10 includes the subject matter of any of Examples 1-9, and wherein: the plurality of instructions, when executed by the processor, further cause the computing device to execute trampoline code with the first memory view in response to storage of the data into the first memory block, wherein the first memory view and the second memory view allow read and execute access to the trampoline code; and to switch to the second memory view comprises to switch to the second memory view by the trampoline code in response to execution of the trampoline code.

Example 11 includes the subject matter of any of Examples 1-10, and wherein: the plurality of instructions, when executed by the processor, further cause the computing device to execute a first virtual machine code with the first memory view, wherein the first memory view allows read and execute access to the first virtual machine code, and wherein the second memory view disallows execute access to the first virtual machine code; to store the data into the first memory block comprises to store the data into the first memory block in response to execution of the first virtual machine code; and to execute the trampoline code comprises to execute the trampoline code in response to execution of the first virtual machine code.

Example 12 includes the subject matter of any of Examples 1-11, and wherein the plurality of instructions, when executed by the processor, further cause the computing device to read, by the second virtual machine, the data from the first memory block in response to notification of the second virtual machine, wherein the second virtual machine has read-only access to the first memory block.

Example 13 includes the subject matter of any of Examples 1-12, and wherein the plurality of instructions, when executed by the processor, further cause the computing device to: enable access by the second virtual machine to a second protected code of the computing device in response to reading of the data from the first memory block, without generation of a virtual machine exit event; execute the second protected code in a context of the second virtual machine in response to enabling of access to the second protected code; and clear a permission of an extended page table associated with the first memory block in response to execution of the second protected code, wherein to clear the permission allows write access by the first virtual machine to the first memory block.

Example 14 includes the subject matter of any of Examples 1-13, and the plurality of instructions, when executed by the processor, further cause the computing device to: notify, by the protected code, one or more additional virtual machines executed by the computing device that the data is available in response to execution of the protected code; determine, by the second protected code, whether the one or more additional virtual machines have completed reading the data from the first memory block in response to the reading of the data from the first memory block; and notify, by the second protected code, the first virtual machine that reading the data is complete in response to a determination that the one or more additional virtual machines have completed reading the data.

Example 15 includes the subject matter of any of Examples 1-14, and wherein: the plurality of instructions, when executed by the processor, further cause the computing device to initialize a counter associated with the first memory block in response to execution of the protected code, wherein the counter indicates a total number of virtual machines to receive the data; and to determine whether the one or more additional virtual machines have read the data from the first memory block comprises to atomically decrement the counter and compare the counter to zero.

Example 16 includes the subject matter of any of Examples 1-15, and wherein: to read the data from the first memory block comprises to read the data from the first memory block using a first memory view in response to notification of the second virtual machine, wherein the first memory view defines a physical memory map of the computing device, and wherein the first memory view allows read-only access to the first memory block and does not allow access to the second protected code; and to enable access to the second protected code comprises to switch, by the second virtual machine, to a second memory view without generation of a virtual machine exit event, wherein the second memory view defines a physical memory map of the computing device, and wherein the second memory view allows execute access to the second protected code.

Example 17 includes the subject matter of any of Examples 1-16, and wherein the plurality of instructions, when executed by the processor, further cause the computing device to: monitor for a notification from the second virtual machine that reading of the data is complete; and disable access by the first virtual machine to the protected code in response to the notification from the second virtual machine that reading of the data is complete, without generation of a virtual machine exit event.

Example 18 includes a method for inter-virtual-machine communication, the method comprising: storing, by a first virtual machine executed by a computing device, data into a first memory block wherein the first virtual machine has read-write access to the first memory block; enabling, by the computing device, access by the first virtual machine to a protected code of the computing device in response to storing the data into the first memory block, without generating a virtual machine exit event; executing, by the computing device, the protected code in a context of the first virtual machine in response to enabling access to the protected code; setting, by the computing device, a permission of an extended page table associated with the first memory block in response to executing the protected code, wherein setting the permission disallows write access and execute access by the first virtual machine to the first memory block; and notifying, by the protected code, a second virtual machine executed by the computing device that the data is available in response to setting the permission.

Example 19 includes the subject matter of Example 18, and wherein enabling access to the protected code comprises executing, by the first virtual machine, a processor instruction to enable access to the protected code without generating a virtual machine exit event.

Example 20 includes the subject matter of any of Examples 18 and 19, and further comprising generating, by a processor of the computing device, a virtual machine exit event in response to a write or execute access to the first memory block by the first virtual machine when the permission is set.

Example 21 includes the subject matter of any of Examples 18-20, and wherein the first memory block comprises one or more physical memory pages of the computing device.

Example 22 includes the subject matter of any of Examples 18-21, and wherein the first memory block is located in a cache memory of the computing device.

Example 23 includes the subject matter of any of Examples 18-22, and wherein: storing the data into the first memory block comprises storing the data into the first memory block using a first memory view, wherein the first memory view defines a physical memory map of the computing device, and wherein the first memory view allows read-write access to the first memory block and does not allow access to the protected code; and enabling access to the protected code comprises switching, by the first virtual machine, to a second memory view without generating a virtual machine exit event, wherein the second memory view defines a physical memory map of the computing device, and wherein the second memory view allows execute access to the protected code.

Example 24 includes the subject matter of any of Examples 18-23, and wherein the first memory view is defined by a first extended page table of the computing device and the second memory view is defined by a second extended page table of the computing device.

Example 25 includes the subject matter of any of Examples 18-24, and wherein switching to the second memory view comprises setting an extended page table pointer of the computing device to reference the second extended page table.

Example 26 includes the subject matter of any of Examples 18-25, and wherein setting the extended page table pointer comprises executing a processor instruction to change the extended page table pointer.

Example 27 includes the subject matter of any of Examples 18-26, and further comprising: executing, by the computing device, trampoline code using the first memory view in response to storing the data into the first memory block, wherein the first memory view and the second memory view allow read and execute access to the trampoline code; wherein switching to the second memory view comprises switching to the second memory view by the trampoline code in response to executing the trampoline code.

Example 28 includes the subject matter of any of Examples 18-27, and further comprising: executing, by the computing device, a first virtual machine code using the first memory view, wherein the first memory view allows read and execute access to the first virtual machine code, and wherein the second memory view disallows execute access to the first virtual machine code; wherein storing the data into the first memory block comprises storing the data into the first memory block in response to executing the first virtual machine code; and wherein executing the trampoline code comprises executing the trampoline code in response to executing the first virtual machine code.

Example 29 includes the subject matter of any of Examples 18-28, and further comprising reading, by the second virtual machine, the data from the first memory block in response to notifying the second virtual machine, wherein the second virtual machine has read-only access to the first memory block.

Example 30 includes the subject matter of any of Examples 18-29, and further comprising: enabling, by the computing device, access by the second virtual machine to a second protected code of the computing device in response to reading the data from the first memory block, without generating a virtual machine exit event; executing, by the computing device, the second protected code in a context of the second virtual machine in response to enabling access to the second protected code; and clearing, by the computing device, a permission of an extended page table associated with the first memory block in response to executing the second protected code, wherein clearing the permission allows write access by the first virtual machine to the first memory block.

Example 31 includes the subject matter of any of Examples 18-30, and further comprising: notifying, by the protected code, one or more additional virtual machines executed by the computing device that the data is available in response to executing the protected code; determining, by the second protected code, whether the one or more additional virtual machines have completed reading the data from the first memory block in response to reading the data from the first memory block; and notifying, by the second protected code, the first virtual machine that reading the data is complete in response to determining that the one or more additional virtual machines have completed reading the data.

Example 32 includes the subject matter of any of Examples 18-31, and further comprising: initializing, by the computing device, a counter associated with the first memory block in response to executing the protected code, wherein the counter indicates a total number of virtual machines to receive the data; wherein determining whether the one or more additional virtual machines have read the data from the first memory block comprises atomically decrementing the counter and comparing the counter to zero.

Example 33 includes the subject matter of any of Examples 18-32, and wherein: reading the data from the first memory block comprises reading the data from the first memory block using a first memory view in response to notifying the second virtual machine, wherein the first memory view defines a physical memory map of the computing device, and wherein the first memory view allows read-only access to the first memory block and does not allow access to the second protected code; and enabling access to the second protected code comprises switching, by the second virtual machine, to a second memory view without generating a virtual machine exit event, wherein the second memory view defines a physical memory map of the computing device, and wherein the second memory view allows execute access to the second protected code.

Example 34 includes the subject matter of any of Examples 18-33, and further comprising: monitoring, by the computing device, for a notification from the second virtual machine that reading the data is complete; and disabling, by the computing device, access by the first virtual machine to the protected code in response to the notification from the second virtual machine that reading the data is complete, without generating a virtual machine exit event.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for inter-virtual-machine communication, the computing device comprising: means for storing, by a first virtual machine executed by the computing device, data into a first memory block wherein the first virtual machine has read-write access to the first memory block; means for enabling access by the first virtual machine to a protected code of the computing device in response to storing the data into the first memory block, without generating a virtual machine exit event; means for executing the protected code in a context of the first virtual machine in response to enabling access to the protected code; means for setting a permission of an extended page table associated with the first memory block in response to executing the protected code, wherein setting the permission disallows write access and execute access by the first virtual machine to the first memory block; and means for notifying, by the protected code, a second virtual machine executed by the computing device that the data is available in response to setting the permission.

Example 39 includes the subject matter of Example 38, and wherein the means for enabling access to the protected code comprises means for executing, by the first virtual machine, a processor instruction to enable access to the protected code without generating a virtual machine exit event.

Example 40 includes the subject matter of any of Examples 38 and 39, and further comprising means for generating, by a processor of the computing device, a virtual machine exit event in response to a write or execute access to the first memory block by the first virtual machine when the permission is set.

Example 41 includes the subject matter of any of Examples 38-40, and wherein the first memory block comprises one or more physical memory pages of the computing device.

Example 42 includes the subject matter of any of Examples 38-41, and wherein the first memory block is located in a cache memory of the computing device.

Example 43 includes the subject matter of any of Examples 38-42, and wherein: the means for storing the data into the first memory block comprises means for storing the data into the first memory block using a first memory view, wherein the first memory view defines a physical memory map of the computing device, and wherein the first memory view allows read-write access to the first memory block and does not allow access to the protected code; and the means for enabling access to the protected code comprises means for switching, by the first virtual machine, to a second memory view without generating a virtual machine exit event, wherein the second memory view defines a physical memory map of the computing device, and wherein the second memory view allows execute access to the protected code.

Example 44 includes the subject matter of any of Examples 38-43, and wherein the first memory view is defined by a first extended page table of the computing device and the second memory view is defined by a second extended page table of the computing device.

Example 45 includes the subject matter of any of Examples 38-44, and wherein the means for switching to the second memory view comprises means for setting an extended page table pointer of the computing device to reference the second extended page table.

Example 46 includes the subject matter of any of Examples 38-45, and wherein the means for setting the extended page table pointer comprises means for executing a processor instruction to change the extended page table pointer.

Example 47 includes the subject matter of any of Examples 38-46, and further comprising: means for executing trampoline code using the first memory view in response to storing the data into the first memory block, wherein the first memory view and the second memory view allow read and execute access to the trampoline code; wherein the means for switching to the second memory view comprises means for switching to the second memory view by the trampoline code in response to executing the trampoline code.

Example 48 includes the subject matter of any of Examples 38-47, and further comprising: means for executing a first virtual machine code using the first memory view, wherein the first memory view allows read and execute access to the first virtual machine code, and wherein the second memory view disallows execute access to the first virtual machine code; wherein the means for storing the data into the first memory block comprises means for storing the data into the first memory block in response to executing the first virtual machine code; and wherein the means for executing the trampoline code comprises means for executing the trampoline code in response to executing the first virtual machine code.

Example 49 includes the subject matter of any of Examples 38-48, and further comprising means for reading, by the second virtual machine, the data from the first memory block in response to notifying the second virtual machine, wherein the second virtual machine has read-only access to the first memory block.

Example 50 includes the subject matter of any of Examples 38-49, and further comprising: means for enabling access by the second virtual machine to a second protected code of the computing device in response to reading the data from the first memory block, without generating a virtual machine exit event; means for executing the second protected code in a context of the second virtual machine in response to enabling access to the second protected code; and means for clearing a permission of an extended page table associated with the first memory block in response to executing the second protected code, wherein clearing the permission allows write access by the first virtual machine to the first memory block.

Example 51 includes the subject matter of any of Examples 38-50, and further comprising: means for notifying, by the protected code, one or more additional virtual machines executed by the computing device that the data is available in response to executing the protected code; means for determining, by the second protected code, whether the one or more additional virtual machines have completed reading the data from the first memory block in response to reading the data from the first memory block; and means for notifying, by the second protected code, the first virtual machine that reading the data is complete in response to determining that the one or more additional virtual machines have completed reading the data.

Example 52 includes the subject matter of any of Examples 38-51, and further comprising: means for initializing a counter associated with the first memory block in response to executing the protected code, wherein the counter indicates a total number of virtual machines to receive the data; wherein the means for determining whether the one or more additional virtual machines have read the data from the first memory block comprises means for atomically decrementing the counter and comparing the counter to zero.

Example 53 includes the subject matter of any of Examples 38-52, and wherein: the means for reading the data from the first memory block comprises means for reading the data from the first memory block using a first memory view in response to notifying the second virtual machine, wherein the first memory view defines a physical memory map of the computing device, and wherein the first memory view allows read-only access to the first memory block and does not allow access to the second protected code; and the means for enabling access to the second protected code comprises means for switching, by the second virtual machine, to a second memory view without generating a virtual machine exit event, wherein the second memory view defines a physical memory map of the computing device, and wherein the second memory view allows execute access to the second protected code.

Example 54 includes the subject matter of any of Examples 38-53, and further comprising: means for monitoring for a notification from the second virtual machine that reading the data is complete; and means for disabling access by the first virtual machine to the protected code in response to the notification from the second virtual machine that reading the data is complete, without generating a virtual machine exit event.

Example 55 includes a computing device for inter-virtual-machine communication, the computing device comprising: unprotected sender circuitry to (i) store, by a first virtual machine executed by the computing device, data into a first memory block wherein the first virtual machine has read-write access to the first memory block, and (ii) enable access by the first virtual machine to a protected code of the computing device in response to storage of the data into the first memory block, without generation of a virtual machine exit event; and protected code circuitry to (i) execute the protected code in a context of the first virtual machine in response to enabling of access to the protected code, (ii) set a permission of an extended page table associated with the first memory block in response to execution of the protected code, wherein setting of the permission disallows write access and execute access by the first virtual machine to the first memory block, and (iii) notify, by the protected code, a second virtual machine executed by the computing device that the data is available in response to the setting of the permission.

Example 56 includes the subject matter of Example 55, and wherein to enable access to the protected code comprises to execute, by the first virtual machine, a processor instruction to enable access to the protected code without generation of a virtual machine exit event.

Example 57 includes the subject matter of any of Examples 55 and 56, and further comprising a processor to generate a virtual machine exit event in response to a write or execute access to the first memory block by the first virtual machine when the permission is set.

Example 58 includes the subject matter of any of Examples 55-57, and wherein the first memory block comprises one or more physical memory pages of the computing device.

Example 59 includes the subject matter of any of Examples 55-58, and wherein the first memory block is located in a cache memory of the computing device.

Example 60 includes the subject matter of any of Examples 55-59, and wherein: to store the data into the first memory block comprises to store the data into the first memory block with a first memory view, wherein the first memory view defines a physical memory map of the computing device, and wherein the first memory view allows read-write access to the first memory block and does not allow access to the protected code; and to enable access to the protected code comprises to switch, by the first virtual machine, to a second memory view without generation of a virtual machine exit event, wherein the second memory view defines a physical memory map of the computing device, and wherein the second memory view allows execute access to the protected code.

Example 61 includes the subject matter of any of Examples 55-60, and wherein the first memory view is defined by a first extended page table of the computing device and the second memory view is defined by a second extended page table of the computing device.

Example 62 includes the subject matter of any of Examples 55-61, and wherein to switch to the second memory view comprises to set an extended page table pointer of the computing device to reference the second extended page table.

Example 63 includes the subject matter of any of Examples 55-62, and wherein to set the extended page table pointer comprises to execute a processor instruction to change the extended page table pointer.

Example 64 includes the subject matter of any of Examples 55-63, and wherein: the unprotected sender circuitry is further to execute trampoline code with the first memory view in response to storage of the data into the first memory block, wherein the first memory view and the second memory view allow read and execute access to the trampoline code; and to switch to the second memory view comprises to switch to the second memory view by the trampoline code in response to execution of the trampoline code.

Example 65 includes the subject matter of any of Examples 55-64, and wherein: the unprotected sender circuitry is further to execute a first virtual machine code with the first memory view, wherein the first memory view allows read and execute access to the first virtual machine code, and wherein the second memory view disallows execute access to the first virtual machine code; to store the data into the first memory block comprises to store the data into the first memory block in response to execution of the first virtual machine code; and to execute the trampoline code comprises to execute the trampoline code in response to execution of the first virtual machine code.

Example 66 includes the subject matter of any of Examples 55-65, and further comprising unprotected receiver circuitry to read, by the second virtual machine, the data from the first memory block in response to notification of the second virtual machine, wherein the second virtual machine has read-only access to the first memory block.

Example 67 includes the subject matter of any of Examples 55-66, and wherein: the unprotected receiver circuitry is further to enable access by the second virtual machine to a second protected code of the computing device in response to reading of the data from the first memory block, without generation of a virtual machine exit event; and the protected code circuitry is further to (i) execute the second protected code in a context of the second virtual machine in response to enabling of access to the second protected code, and (ii) clear a permission of an extended page table associated with the first memory block in response to execution of the second protected code, wherein to clear the permission allows write access by the first virtual machine to the first memory block.

Example 68 includes the subject matter of any of Examples 55-67, and wherein the protected code circuitry is further to: notify, by the protected code, one or more additional virtual machines executed by the computing device that the data is available in response to execution of the protected code; determine, by the second protected code, whether the one or more additional virtual machines have completed reading the data from the first memory block in response to the reading of the data from the first memory block; and notify, by the second protected code, the first virtual machine that reading the data is complete in response to a determination that the one or more additional virtual machines have completed reading the data.

Example 69 includes the subject matter of any of Examples 55-68, and wherein: the protected code circuitry is further to initialize a counter associated with the first memory block in response to execution of the protected code, wherein the counter indicates a total number of virtual machines to receive the data; and to determine whether the one or more additional virtual machines have read the data from the first memory block comprises to atomically decrement the counter and compare the counter to zero.

Example 70 includes the subject matter of any of Examples 55-69, and wherein: to read the data from the first memory block comprises to read the data from the first memory block using a first memory view in response to notification of the second virtual machine, wherein the first memory view defines a physical memory map of the computing device, and wherein the first memory view allows read-only access to the first memory block and does not allow access to the second protected code; and to enable access to the second protected code comprises to switch, by the second virtual machine, to a second memory view without generation of a virtual machine exit event, wherein the second memory view defines a physical memory map of the computing device, and wherein the second memory view allows execute access to the second protected code.

Example 71 includes the subject matter of any of Examples 55-70, and wherein the protected code circuitry is further to: monitor for a notification from the second virtual machine that reading of the data is complete; and disable access by the first virtual machine to the protected code in response to the notification from the second virtual machine that reading of the data is complete, without generation of a virtual machine exit event.

The invention claimed is:

1. A computing device for inter-virtual-machine communication, the computing device comprising:
   a processor; and
   one or more memory devices having stored therein a plurality of instructions that, when executed by the processor, cause the computing device to:
     store, by a first virtual machine executed by the computing device, data into a first memory block wherein the first virtual machine has read-write access to the first memory block;
     enable access by the first virtual machine to a protected code of the computing device in response to storage of the data into the first memory block, without generation of a virtual machine exit event;
     execute the protected code in a context of the first virtual machine in response to enabling of access to the protected code;
     set a permission of an extended page table associated with the first memory block in response to execution of the protected code, wherein setting of the permission disallows write access and execute access by the first virtual machine to the first memory block;
     notify, by the protected code, a second virtual machine executed by the computing device that the data is available in response to the setting of the permission;
     read, by the second virtual machine, the data from the first memory block in response to notification of the second virtual machine, wherein the second virtual machine has read-only access to the first memory block;
     enable access by the second virtual machine to a second protected code of the computing device in response to reading of the data from the first memory block, without generation of a virtual machine exit event;
     execute the second protected code in a context of the second virtual machine in response to enabling of access to the second protected code; and
     clear a permission of an extended page table associated with the first memory block in response to execution of the second protected code, wherein to clear the permission allows write access by the first virtual machine to the first memory block.

2. The computing device of claim 1, wherein to enable access to the protected code comprises to execute, by the first virtual machine, a processor instruction to enable access to the protected code without generation of a virtual machine exit event.

3. The computing device of claim 1, wherein the processor is further to generate a virtual machine exit event in response to a write or execute access to the first memory block by the first virtual machine when the permission is set.

4. The computing device of claim 1, wherein:
   to store the data into the first memory block comprises to store the data into the first memory block with a first memory view, wherein the first memory view defines a physical memory map of the computing device, and wherein the first memory view allows read-write access to the first memory block and does not allow access to the protected code; and
   to enable access to the protected code comprises to switch, by the first virtual machine, to a second memory view without generation of a virtual machine exit event, wherein the second memory view defines a physical memory map of the computing device, and wherein the second memory view allows execute access to the protected code.

5. The computing device of claim 4, wherein the first memory view is defined by a first extended page table of the computing device and the second memory view is defined by a second extended page table of the computing device.

6. The computing device of claim 5, wherein to switch to the second memory view comprises to set an extended page table pointer of the computing device to reference the second extended page table.

7. The computing device of claim 6, wherein to set the extended page table pointer comprises to execute a processor instruction to change the extended page table pointer.

8. The computing device of claim 1, the plurality of instructions, when executed by the processor, further cause the computing device to:
notify, by the protected code, one or more additional virtual machines executed by the computing device that the data is available in response to execution of the protected code;
determine, by the second protected code, whether the one or more additional virtual machines have completed reading the data from the first memory block in response to the reading of the data from the first memory block; and
notify, by the second protected code, the first virtual machine that reading the data is complete in response to a determination that the one or more additional virtual machines have completed reading the data.

9. The computing device of claim 8, wherein:
the plurality of instructions, when executed by the processor, further cause the computing device to initialize a counter associated with the first memory block in response to execution of the protected code, wherein the counter indicates a total number of virtual machines to receive the data; and
to determine whether the one or more additional virtual machines have read the data from the first memory block comprises to atomically decrement the counter and compare the counter to zero.

10. The computing device of claim 1, wherein the plurality of instructions, when executed by the processor, further cause the computing device to:
monitor for a notification from the second virtual machine that reading of the data is complete; and
disable access by the first virtual machine to the protected code in response to the notification from the second virtual machine that reading of the data is complete, without generation of a virtual machine exit event.

11. One or more non-transitory, computer-readable storage media comprising a plurality of instructions that in response to being executed cause a computing device to:
store, by a first virtual machine executed by the computing device, data into a first memory block wherein the first virtual machine has read-write access to the first memory block;
enable access by the first virtual machine to a protected code of the computing device in response to storing the data into the first memory block, without generating a virtual machine exit event;
execute the protected code in a context of the first virtual machine in response to enabling access to the protected code;
set a permission of an extended page table associated with the first memory block in response to executing the protected code, wherein setting the permission disallows write access and execute access by the first virtual machine to the first memory block;
notify, by the protected code, a second virtual machine executed by the computing device that the data is available in response to setting the permission;
read, by the second virtual machine, the data from the first memory block in response to notifying the second virtual machine, wherein the second virtual machine has read-only access to the first memory block;
enable access by the second virtual machine to a second protected code of the computing device in response to reading the data from the first memory block, without generating a virtual machine exit event;
execute the second protected code in a context of the second virtual machine in response to enabling access to the second protected code; and
clear a permission of an extended page table associated with the first memory block in response to executing the second protected code, wherein clearing the permission allows write access by the first virtual machine to the first memory block.

12. The one or more non-transitory, computer-readable storage media of claim 11, wherein to enable access to the protected code comprises to execute, by the first virtual machine, a processor instruction to enable access to the protected code without generating a virtual machine exit event.

13. The one or more non-transitory, computer-readable storage media of claim 11, further comprising a plurality of instructions that in response to being executed cause the computing device to generate, by a processor of the computing device, a virtual machine exit event in response to a write or execute access to the first memory block by the first virtual machine when the permission is set.

14. The one or more non-transitory, computer-readable storage media of claim 11, wherein:
to store the data into the first memory block comprises to store the data into the first memory block using a first memory view, wherein the first memory view defines a physical memory map of the computing device, and wherein the first memory view allows read-write access to the first memory block and does not allow access to the protected code; and
to enable access to the protected code comprises to switch, by the first virtual machine, to a second memory view without generating a virtual machine exit event, wherein the second memory view defines a physical memory map of the computing device, and wherein the second memory view allows execute access to the protected code.

15. A computing device for inter-virtual-machine communication, the computing device comprising:
means for storing, by a first virtual machine executed by the computing device, data into a first memory block wherein the first virtual machine has read-write access to the first memory block;
means for enabling access by the first virtual machine to a protected code of the computing device in response to storing the data into the first memory block, without generating a virtual machine exit event;
means for executing the protected code in a context of the first virtual machine in response to enabling access to the protected code;
means for setting a permission of an extended page table associated with the first memory block in response to executing the protected code, wherein setting the permission disallows write access and execute access by the first virtual machine to the first memory block;

means for notifying, by the protected code, a second virtual machine executed by the computing device that the data is available in response to setting the permission;

means for reading, by the second virtual machine, the data from the first memory block in response to notifying the second virtual machine, wherein the second virtual machine has read-only access to the first memory block;

means for enabling access by the second virtual machine to a second protected code of the computing device in response to reading the data from the first memory block, without generating a virtual machine exit event;

means for executing the second protected code in a context of the second virtual machine in response to enabling access to the second protected code; and means for clearing a permission of an extended page table associated with the first memory block in response to executing the second protected code, wherein clearing the permission allows write access by the first virtual machine to the first memory block.

16. The computing device of claim 15, wherein:

the means for storing the data into the first memory block comprises means for storing the data into the first memory block using a first memory view, wherein the first memory view defines a physical memory map of the computing device, and wherein the first memory view allows read-write access to the first memory block and does not allow access to the protected code; and the means for enabling access to the protected code comprises means for switching, by the first virtual machine, to a second memory view without generating a virtual machine exit event, wherein the second memory view defines a physical memory map of the computing device, and wherein the second memory view allows execute access to the protected code.

17. A method for inter-virtual-machine communication, the method comprising:

storing, by a first virtual machine executed by a computing device, data into a first memory block wherein the first virtual machine has read-write access to the first memory block;

enabling, by the computing device, access by the first virtual machine to a protected code of the computing device in response to storing the data into the first memory block, without generating a virtual machine exit event;

executing, by the computing device, the protected code in a context of the first virtual machine in response to enabling access to the protected code;

setting, by the computing device, a permission of an extended page table associated with the first memory block in response to executing the protected code, wherein setting the permission disallows write access and execute access by the first virtual machine to the first memory block;

notifying, by the protected code, a second virtual machine executed by the computing device that the data is available in response to setting the permission;

reading, by the second virtual machine, the data from the first memory block in response to notifying the second virtual machine, wherein the second virtual machine has read-only access to the first memory block;

enabling access by the second virtual machine to a second protected code of the computing device in response to reading the data from the first memory block, without generating a virtual machine exit event;

executing the second protected code in a context of the second virtual machine in response to enabling access to the second protected code; and clearing a permission of an extended page table associated with the first memory block in response to executing the second protected code, wherein clearing the permission allows write access by the first virtual machine to the first memory block.

18. The method of claim 17, wherein:

storing the data into the first memory block comprises storing the data into the first memory block using a first memory view, wherein the first memory view defines a physical memory map of the computing device, and wherein the first memory view allows read-write access to the first memory block and does not allow access to the protected code; and enabling access to the protected code comprises switching, by the first virtual machine, to a second memory view without generating a virtual machine exit event, wherein the second memory view defines a physical memory map of the computing device, and wherein the second memory view allows execute access to the protected code.

* * * * *